United States Patent
Inakoshi

(10) Patent No.: US 9,288,782 B2
(45) Date of Patent: Mar. 15, 2016

(54) COMMUNICATION CONTROL METHOD, GATEWAY DEVICE, AND HOME BASE STATION

(71) Applicant: KYOCERA CORPORATION, Kyoto-shi, Kyoto (JP)

(72) Inventor: Atsuhisa Inakoshi, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/384,717

(22) PCT Filed: Mar. 12, 2013

(86) PCT No.: PCT/JP2013/056837
§ 371 (c)(1),
(2) Date: Sep. 12, 2014

(87) PCT Pub. No.: WO2013/137265
PCT Pub. Date: Sep. 19, 2013

(65) Prior Publication Data
US 2015/0065130 A1    Mar. 5, 2015

Related U.S. Application Data

(60) Provisional application No. 61/611,996, filed on Mar. 16, 2012.

(51) Int. Cl.
| | | |
|---|---|---|
| *H04W 4/00* | (2009.01) |
| *H04W 60/06* | (2009.01) |
| *H04W 8/06* | (2009.01) |
| *H04W 24/02* | (2009.01) |
| *H04W 84/04* | (2009.01) |
| *H04W 88/16* | (2009.01) |
| *H04W 40/24* | (2009.01) |

(52) U.S. Cl.
CPC .............. *H04W 60/06* (2013.01); *H04W 8/065* (2013.01); *H04W 24/02* (2013.01); *H04W 40/248* (2013.01); *H04W 84/045* (2013.01); *H04W 88/16* (2013.01)

(58) Field of Classification Search
None
See application file for complete search history.

(56) References Cited

U.S. PATENT DOCUMENTS

2011/0002297 A1 * 1/2011 Jain et al. ...................... 370/331

FOREIGN PATENT DOCUMENTS

WO    2010/080056 A1    7/2010

OTHER PUBLICATIONS

3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Valbonne—France, 2011, pp. 1-194.
(Continued)

*Primary Examiner* — Adolf Dsouza
(74) *Attorney, Agent, or Firm* — Hauptman Ham, LLP

(57) ABSTRACT

A communication control method applied to a mobile communication system including a gateway device that is positioned between a core network and home base stations to control the home base stations, comprises: a selecting step of selecting, by the gateway device, a home base station to be deregistered in the control of the gateway device from among the home base stations; and a transmitting step of transmitting, by the gateway device, deregistration information indicating the deregistration to the home base station selected in the selecting step.

3 Claims, 7 Drawing Sheets

(56) References Cited

OTHER PUBLICATIONS

Nokia Siemens Networks, Nokia, HeNB's S1 simplification by means of He GW, 3GPP TSG RAN WG3 Meeting #59, R3-080155, Sorrento, Italy, Feb. 11-15, 2008, pp. 1-7.

Alcatel-Lucent, ZTE, Overload Handling by HeNB GW, 3GPP TSG-RAN WG2 Meeting #75, R2-114826, Athens, Greece, Aug. 22-26, 2011, pp. 1-11.

International Search Report mailed May 7, 2013, in corresponding International Application No. PCT/JP2013/056837.

* cited by examiner

COMMUNICATION CONTROL METHOD, GATEWAY DEVICE, AND HOME BASE STATION

RELATED APPLICATIONS

The present application is a National Phase of International Application Number PCT/JP2013/056837 filed on Mar. 12, 2013, and claims priority of U.S. Provisional Application No. 61/611,996 filed on Mar. 16, 2012.

TECHNICAL FIELD

The present invention relates to a communication control method, a gateway device and a home base station in a mobile communication system.

BACKGROUND ART

In 3GPP (3rd Generation Partnership Project), which is a project aiming to standardize a mobile communication system, specifications of a home base station, which is a small base station provided in a home or a company, and those of a gateway device that manages a plurality of home base stations are discussed (see Non-patent Document 1).

Such a gateway device can manage a subordinate home base station in place of a mobility management device provided in a core network (a core network device), and therefore, the load on a core network can be reduced.

PRIOR ART DOCUMENT

Non-Patent Document

[Non-patent Document 1] 3GPP technology specifications "TS 36.300 V11.0.0" December, 2011

SUMMARY OF THE INVENTION

Unfortunately, under the environment where a number of home base stations are provided, there is a concern that the number of the home base stations to be controlled by the gateway device exceeds an upper limit.

Accordingly, an object of the present invention is to provide a communication control method, a gateway device and a home base station with which it is possible to appropriately control a home base station.

The present invention has following features in order to solve the aforementioned problem.

A communication control method according to the present invention is applied to a mobile communication system including a gateway device that is positioned between a core network and home base stations to control the home base stations. The method comprises: a selecting step of selecting, by the gateway device, a home base station to be deregistered in the control of the gateway device from among the home base stations; and a transmitting step of transmitting, by the gateway device, deregistration information indicating the deregistration to the home base station selected in the selecting step.

In the selecting step, the gateway device may select preferentially a first home base station as the home base station to be deregistered, wherein the first home base station is the home base station not having a communication channel between base stations, which is passing through the gateway device, with another base station not in the control of the gateway device.

In the selecting step, the gateway device may select preferentially a second home base station as the home base station to be deregistered, wherein the second home base station is the home base station not being adjacent to another home base station in the control of the gateway device.

The communication control method may further comprise a comparing step of comparing, by the gateway device, a number of the home base stations registered in the control of the gateway device with a threshold value, wherein the gateway device may select the home base station to be deregistered in the control of the gateway device from among the home base stations, when the number of the home base stations exceeds the threshold value, in the selecting step.

The communication control method according may further comprise a comparing step of comparing, by the gateway device, a load level of the gateway device with a predetermined level, wherein the gateway device selects the home base station to be deregistered in the control of the gateway device from among the home base stations, when the load level exceeds the predetermined value, in the selecting step.

The home base station registered in the control of the gateway device establishes a first connection with the gateway device. The method further comprises a step of executing, by the home base station, which receives the deregistration information, disconnecting the first connection and connecting a second connection to the core network.

A gateway device according to the present invention is positioned between a core network and home base stations to control the home base stations. The gateway device comprises: selection means that selects a home base station to be deregistered in the control of the gateway device from among the home base stations; and transmission means that transmits deregistration information indicating the deregistration to the home base station selected by the selection means.

The selection means may select preferentially a first home base station as the home base station to be deregistered, wherein the first home base station is the home base station not having a communication channel between base stations, which is passing through the gateway device, with another base station not in the control of the gateway device.

The selection means may select preferentially a second home base station as the home base station to be deregistered, wherein the second home base station is the home base station not being adjacent to another home base station in the control of the gateway device.

A home base station according to the present invention is registered in a control of a gateway device. The home base station comprising: controlling means that disconnects a first connection with the gateway device and connects a second connection with core network, when the home base station receives deregistration information indicating the deregistration in the gateway device from the gateway device.

MODES FOR CARRYING OUT THE INVENTION

Overview of Embodiment

A communication control method according to the present embodiment is applied to a mobile communication system including a gateway device that is positioned between a core network and home base stations to control the home base stations. The method comprises: a selecting step of selecting, by the gateway device, a home base station to be deregistered in the control of the gateway device from among the home base stations; and a transmitting step of transmitting, by the gateway device, deregistration information indicating the deregistration to the home base station selected in the selecting step.

Accordingly, under the environment where a number of home base stations are provided, since the number of the home base stations to be controlled is adjusted, the gateway device can appropriately control the home base station.

Embodiment

In the present embodiment, an example of a mobile communication system configured on the basis of 3GPP standards (that is, LTE-Advanced) after release 10 will be described.

Hereinafter, (1) Overview of mobile communication system, (2) Block configuration, (3) Operation, and (4) Summary of embodiment will be sequentially described.

(1) Overview of Mobile Communication System

Figure 1:
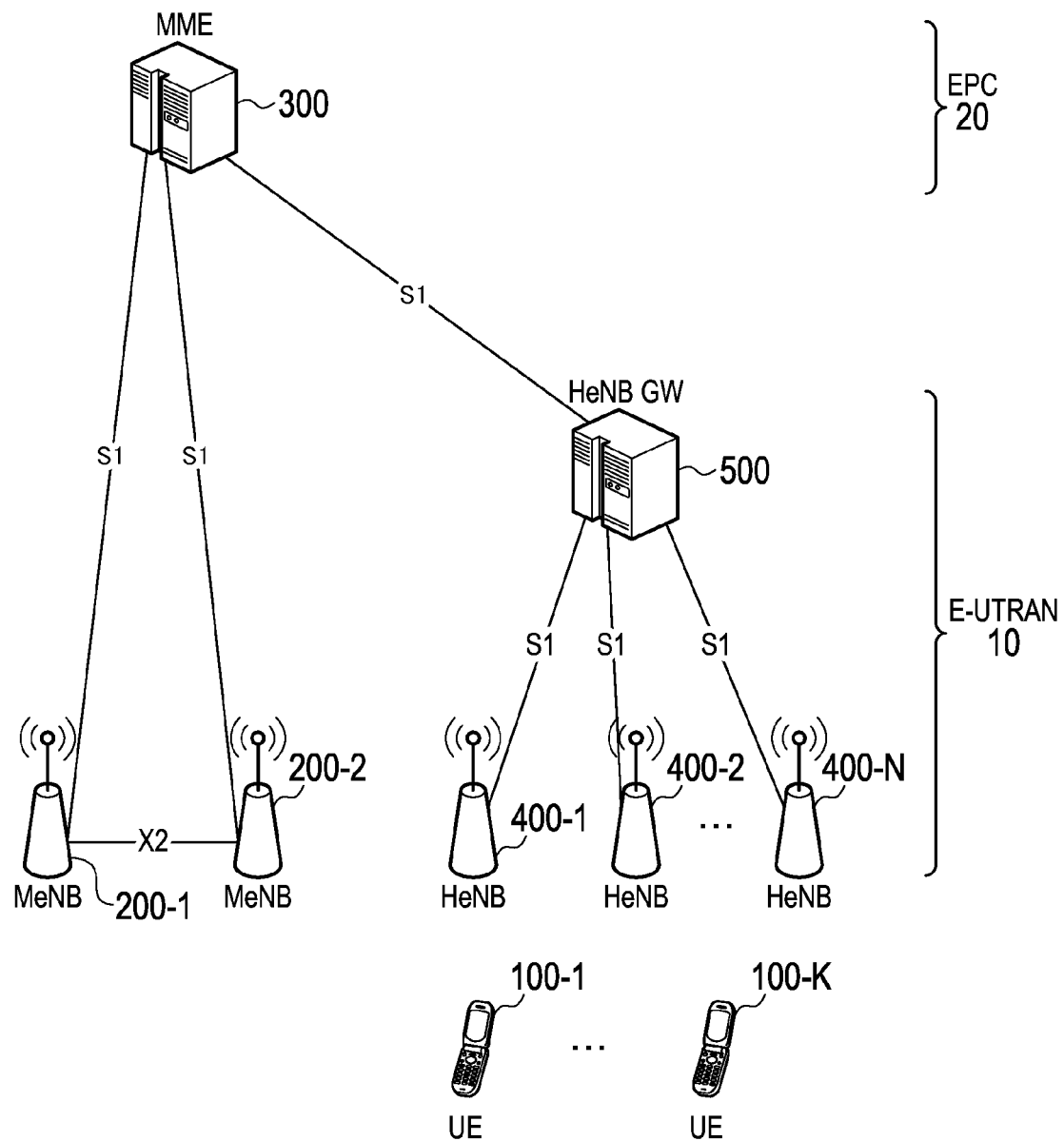
FIG. 1 is a diagram showing a configuration of a mobile communication system.

FIG. 1 is a configuration diagram of a mobile communication system according to the present embodiment. As illustrated in FIG. 1, the mobile communication system includes a user terminal (UE: User Equipment) 100, a macro base station (MeNB: Macro evolved Node-B) 200, a mobility management device (MME: Mobility Management Entity) 300, a home base station (HeNB: Home evolved Node-B) 400, and a gateway device (HeNB GW: Home evolved Node-B Gateway) 500.

Each of the MeNB 200, the HeNB 400, and the HeNB GW 500 is a network device included in a radio access network (E-UTRAN: Evolved-UMTS Terrestrial Radio Access Network) 10. The MME 300 is a network device included in a core network (EPC: Evolved Packet Core) 20.

The UE 100 is a mobile radio communication device carried by a user. The UE 100 performs radio communication with a cell (called a "serving cell"), with which a connection is established, in a connected state corresponding to a state during communication. When the UE 100 moves together with the movement of a user, a change in the serving cell of the UE 100 is necessary. A process in which the UE 100 changes the serving cell in an RRC connected state, is called "handover".

The MeNB 200 is a large stationary radio communication device installed by an operator. The MeNB 200 forms one macro cell or a plurality of macro cells. The MeNB 200 performs radio communication with the UE 100. Furthermore, the MeNB 200 communicates with the EPC 20 through an S1 interface that is a logical communication path between the MeNB 200 and the EPC 20. Specifically, the MeNB 200 communicates with the MME 300 through an S1-MME interface which is a kind of the S1 interface. Moreover, the MeNB 200 performs inter-base station communication with an adjacent MeNB 200 through an X2 interface that is a logical communication path between the MeNB 200 and the adjacent MeNB 200.

The MME 300 is provided corresponding to a control plane dealing with control information, and performs various types of mobility management or verification processes for the UE 100.

The HeNB 400 is a small stationary radio communication device installable within the house. The MeNB 200 forms a specific cell having a coverage narrower than that of a macro cell. The specific cell is called a "CSG (Closed Subscriber Group) cell", a "hybrid cell", or an "open cell" according to a set access mode.

The CSG cell is a cell accessible only by UE 100 (called a "member UE") having an access permission, and broadcasts CSG ID. The UE 100 holds a list (called a "white list") of CSG ID for which the UE 100 has an access permission, and determines the presence or absence of access permission on the basis of the white list, and the CSG ID broadcasted by the CSG cell.

The hybrid cell is a cell in which the member UE is more advantageously treated as compared with a non-member UE, and broadcasts information, which indicates that the hybrid cell is a cell released to the non-member UE, in addition to the CSG ID. The UE 100 determines the presence or absence of access permission on the basis of the white list, and the CSG ID broadcasted by the hybrid cell.

The open cell is a cell in which UE is treated equally whether UE is a member or a non-member, and does not broadcast CSG ID. In view of UE, the open cell is seen as same as the macro cell.

The HeNB 400 communicates with the MME 300 passing through the HeNB GW 500 through the S1 interface (the S1-MME interface). However, when the S1 interface without passing through the HeNB GW 500 is established between the HeNB 400 and the MME 300, the HeNB 400 is able to directly communicate with the MME 300, without undergoing the HeNB GW 500.

The HeNB GW 500 manages a set of a plurality of HeNBs 400 between the EPC 20 (the MME 300) and the plurality of HeNBs 400. In view of the MME 300, the HeNB GW 500 is equal to the HeNB 400. On the other hand, in view of the HeNB 400, the HeNB GW 500 is equal to the MME 300. The HeNB GW 500 communicates with the MME 300 as a representative of the plurality of HeNBs 400, thereby reducing traffic to be transmitted to/received from the MME 300. Furthermore, the HeNB GW 500 is able to relay data from one HeNB 400 in the control of the HeNB GW 500 to another HeNB 400.

In the present embodiment, after the HeNB GW 500 establishes an X2 interface between the HeNB GW 500 and at least one MeNB 200, the X2 interface passing through the HeNB GW 500 is established between the MeNB 200 and at least one HeNB 400.

Figure 2:
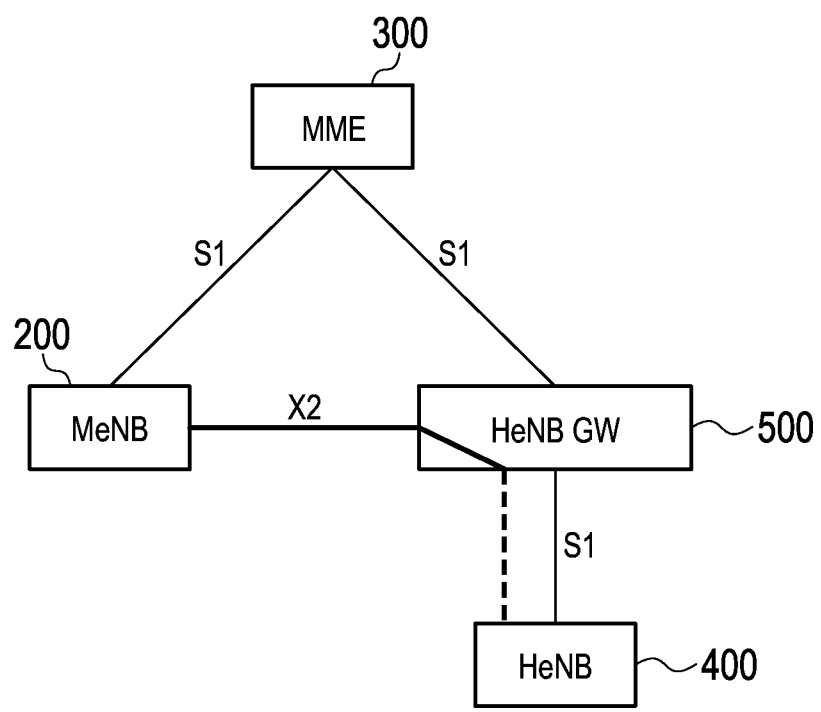
FIG. 2 is a diagram illustrating an X2 interface established between MeNB and HeNB.

FIG. 2 is a diagram for explaining an X2 interface established between the MeNB 200 and the HeNB 400. The HeNB GW 500 is connected to the MeNB 200 through the X2 interface. Hereinafter, a connection through the X2 interface will be referred to as an "X2 connection". Furthermore, the HeNB GW 500 is connected to a plurality of HeNBs 400 through an S1 interface. Hereinafter, a connection through the S1 interface will be referred to as an "S1 connection".

As illustrated in FIG. 2, the X2 interface passing through the HeNB GW 500 instead of the EPC 20 (the MME 300) is established between the HeNB 400 and the MeNB 200. Accordingly, the HeNB 400 and the MeNB 200 can perform communication between base stations using the established X2 interface.

Figure 3:
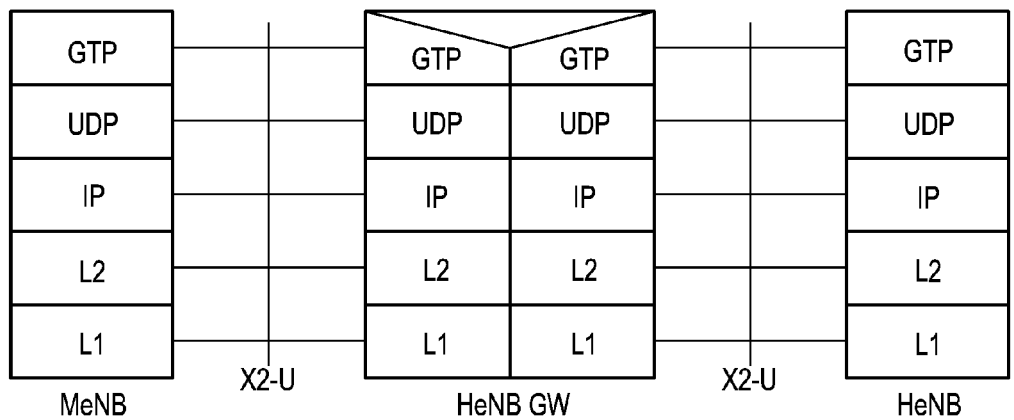
FIG. 3 is a diagram showing a protocol stack of a user plane related to the X2 interface established between the MeNB and the HeNB.
Figure 4:
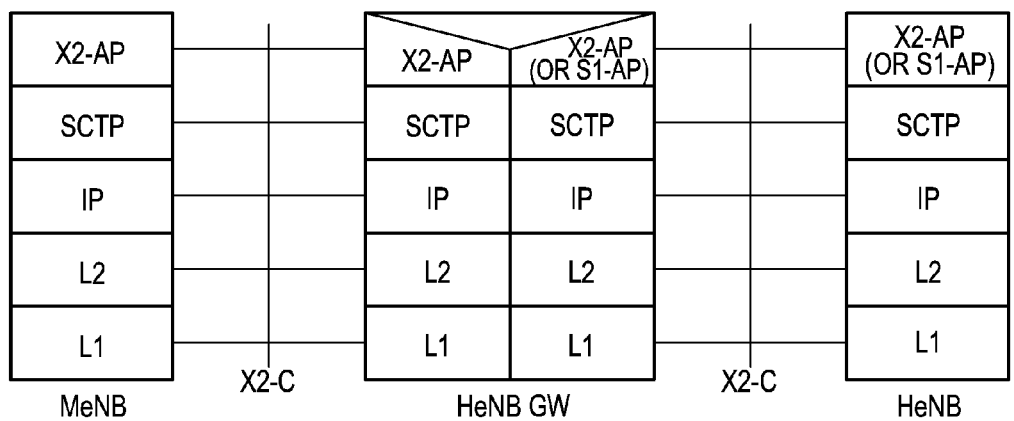
FIG. 4 is a diagram showing a protocol stack of a control plane related to the X2 interface established between the MeNB and the HeNB.

FIG. 3 and FIG. 4 are protocol stack diagrams related to the X2 interface established between the MeNB 200 and the HeNB 400.

As illustrated in FIG. 3, as regards the user plane handling user data, an IP (Internet Protocol) and a UDP (User Datagram Protocol) are provided on a layer 1 (L1) and a layer 2 (L2), and a GTP (GPRS Tunneling Protocol) is provided on the UDP.

As illustrated in FIG. 4, as regards the control plane, an IP and an SCTP (Stream. Control Transmission Protocol) are provided on the L1 and the L2, and X2-AP (X2 Application Protocol) is provided on the SCTP. The X2-AP performs a handover-related process and a process of controlling inter-base station interference.

For example, as the handover-related process, the X2-AP performs a handover procedure including a handover request (Handover Request), a handover response (Handover Request ACK/NACK), and the like. Furthermore, as the process of controlling the inter-base station interference, the X2-AP performs a Load Indication procedure of transmitting/receiving the interference control information. For details of the X2-AP, for example, refer to 3GPP technology specifications "TS 36.423 V10.1.0".

As described above, by establishing the X2 interface passing through the HeNB GW 500 instead of the EPC 20 (the MME 300) is established between the HeNB 400 and the MeNB 200, the HeNB 400 and the MeNB 200 can communicate between the base stations using the X2 interface established. Therefore the load of EPC 20 (MME 300) can be reduced, as the handover-related process and the process of controlling the inter-base station interference can be performed without EPC 20 (MME 300).

S1-AP may be provided between the HeNB 400 and the HeNB GW 500, and in the HeNB GW 500, a conversion from the S1-AP to the X2-AP, and a conversion from the X2-AP to the S1-AP may be performed.

(2) Block Configuration

Hereinafter, the block configurations of the UE 100, the MeNB 200, the MME 300, the HeNB 400, and the HeNB GW 500 will be described.

(2.1) UE

Figure 5:
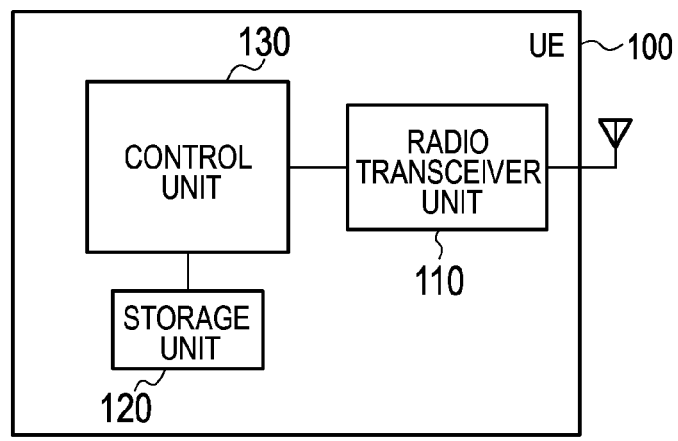
FIG. 5 is a block diagram of UE.

FIG. 5 is a block diagram of the UE 100. As illustrated in FIG. 5, the UE 100 includes a radio transceiver unit 110, a storage unit 120, and a control unit 130.

The radio transceiver unit 110 transmits/receives a radio signal.

The storage unit 120 stores various types of information that is used for the control by the control unit 130. The storage unit 120 stores a white list.

The control unit 130 controls various functions of the UE 100. In a connected state, the control unit 130 controls the radio transceiver unit 110 to perform radio communication with a serving cell.

In a connected state, when a CSG cell or a hybrid cell for which an access permission is available is detected on the basis of the CSG ID received from the CSG cell or the hybrid cell, and the white list, the control unit 130 performs the control for establishing a connection with the cell.

(2.2) MeNB

Figure 6:
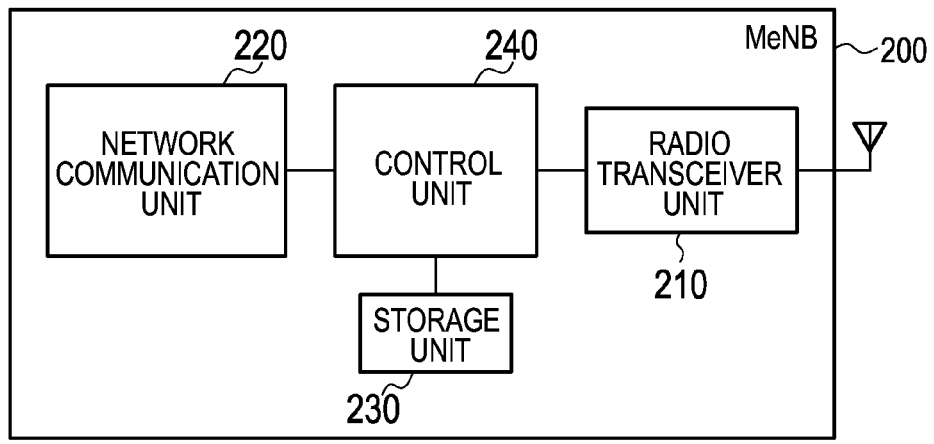
FIG. 6 is a block diagram of the MeNB.

FIG. 6 is a block diagram of the MeNB 200. As illustrated in FIG. 6, the MeNB 200 includes a radio transceiver unit 210, a network communication unit 220, a storage unit 230, and a control unit 240.

The radio transceiver unit 210 transmits/receives a radio signal. Furthermore, the radio transceiver unit 210 forms one macro cell or a plurality of macro cells.

The network communication unit 220 performs inter-base station communication with another MeNB through the X2 interface. The network communication unit 220 communicates with the MME 300 through the S1 interface.

When an X2 interface is established between the MeNB 200 and the HeNB 400, the network communication unit 220 can perform inter-base station communication with the HeNB 400 through the X2 interface.

The storage unit 230 stores various types of information that is used for the control by the control unit 240. The control unit 240 controls various functions of the MeNB 200.

(2.3) MME

Figure 7:
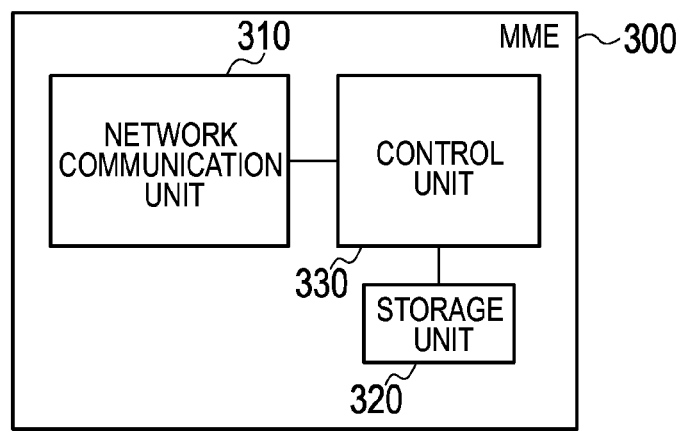
FIG. 7 is a block diagram of MME.

FIG. 7 is a block diagram of the MME 300. As illustrated in FIG. 7, the MME 300 includes a network communication unit 310, a storage unit 320, and a control unit 330.

The network communication unit 310 communicates with the MeNB 200 and the HeNB GW 500 through the S1 interface.

The storage unit 320 stores various types of information that is used for the control by the control unit 330.

The control unit 330 controls various functions of the MME 300. For example, when the UE 100 performs a handover between base stations (eNBs) in which the X2 interface is not established, the control unit 330 performs the control for the handover.

When the S1 interface passing through the HeNB GW 500 is established between the HeNB 400 and the MME 300, upon receiving notification of deregistration of any HeNB 400 from the HeNB GW 500, the control unit 330 controls such that a new S1 interface not passing through the HeNB GW 500 is established between the HeNB 400 and the MME 300.

(2.4) HeNB

Figure 8:
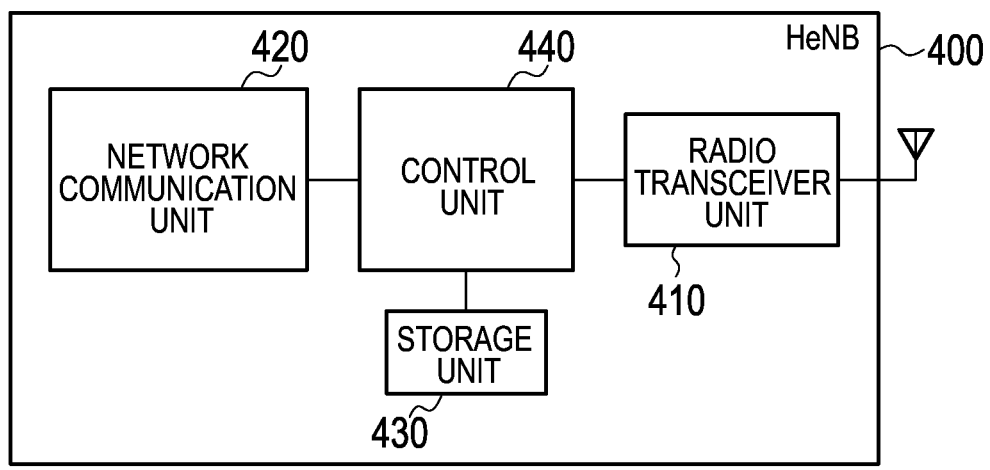
FIG. 8 is a block diagram of the HeNB.

FIG. 8 is a block diagram of the HeNB 400. As illustrated in FIG. 8, the HeNB 400 includes a radio transceiver unit 410, a network communication unit 420, a storage unit 430, and a control unit 440.

The radio transceiver unit 410 transmits/receives a radio signal. Furthermore, the radio transceiver unit 410 forms a CSG cell, a hybrid cell, or an open cell.

When the S1 interface passing through the HeNB GW 500 is established between the HeNB 400 and the MME 300, the network communication unit 420 performs communication with the MME 300 through the HeNB GW 500. Meanwhile, when the S1 interface not passing through the HeNB GW 500 is established between the HeNB 400 and the MME 300, the network communication unit 420 performs direct communication with the MME 300.

When an X2 interface is established between the HeNB 400 and the MeNB 200, the network communication unit 420 can perform inter-base station communication with the MeNB 200 through the X2 interface.

The storage unit 430 stores various types of information that is used for the control by the control unit 440.

The control unit 440 controls various functions of the HeNB 400. When the S1 interface passing through the HeNB GW 500 is established between the HeNB 400 and the MME 300, upon receiving a Deregistration message by the network communication unit 420 from the HeNB GW 500, the control unit 440 controls such that the S1 interface is changed to a new S1 interface not passing through the HeNB GW 500. The Deregistration message corresponds to registration canceling information indicating the registration being canceled by the HeNB GW 500.

(2.5) HeNB GW

Figure 9:
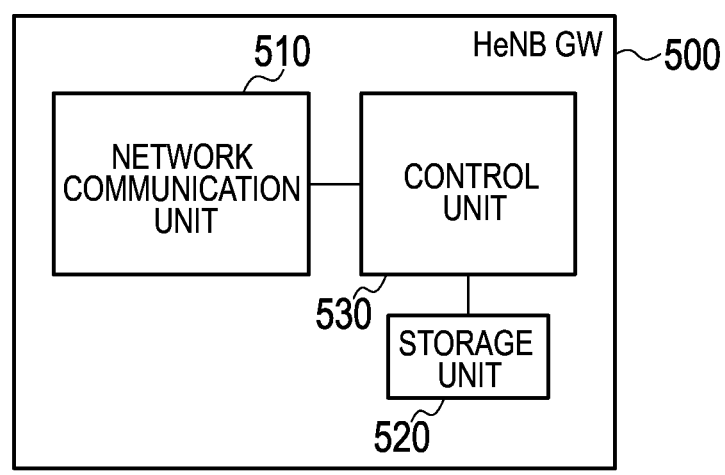
FIG. 9 is a block diagram of HeNB GW.

FIG. 9 is a block diagram of the HeNB GW 500. As illustrated in FIG. 9, the HeNB GW 500 includes a network communication unit 510, a storage unit 520, and a control unit 530.

The network communication unit 510 communicates with the MME 300 and the HeNB 400 through the S1 interface.

The storage unit 520 stores various types of information that is used for the control by the control unit 530. In the storage unit 520, the HeNB 400 in the control of the HeNB GW 500 (that is, the HeNB 400 having an S1 connection with the HeNB GW 500) is registered.

The control unit 530 controls various functions of the HeNB GW 500. The control unit 530 manages a set of a plurality of HeNBs 400. The control unit 530 controls the network communication unit 510 to communicate with the MME 300 as a representative of the plurality of HeNBs 400.

The control unit 530 controls the network communication unit 510 to relay data from one HeNB 400 in the control of the HeNB GW 500 to another HeNB 400.

When the X2 interface passing through the HeNB GW 500 is established between MeNB 200 and the HeNB 400, the control unit 530 controls the network communication unit 510 to relay communication between base stations performed between the MeNB 200 and the HeNB 400.

In the present embodiment, for example, when the number of the HeNBs 400 registered in the control of the HeNB GW 500 exceeds a threshold value or when a load level of the HeNB GW 500 exceeds a predetermined level, the control unit 530 performs the following process.

First, the control unit 530 selects the HeNB 400 to be deregistered in the control of the HeNB GW 500. For example, the control unit 530 selects preferentially the HeNB 400 not having the X2 interface between the HeNB 400 and the MeNB 200, as the HeNB 400 to be deregistered. Alternatively, the control unit 530 selects preferentially the HeNB 400 not adjacent to another HeNB 400 in the control of the HeNB GW 500, as the HeNB 400 to be deregistered. When the HeNB 400 to be deregistered is selected, the control unit 530 controls the storage unit 520 to cancel the registration of the HeNB 400.

Secondly, the control unit 530 controls the network communication unit 510 to transmit the Deregistration message indicating the registration being canceled to the selected HeNB 400.

(3) Operation

Figure 10:
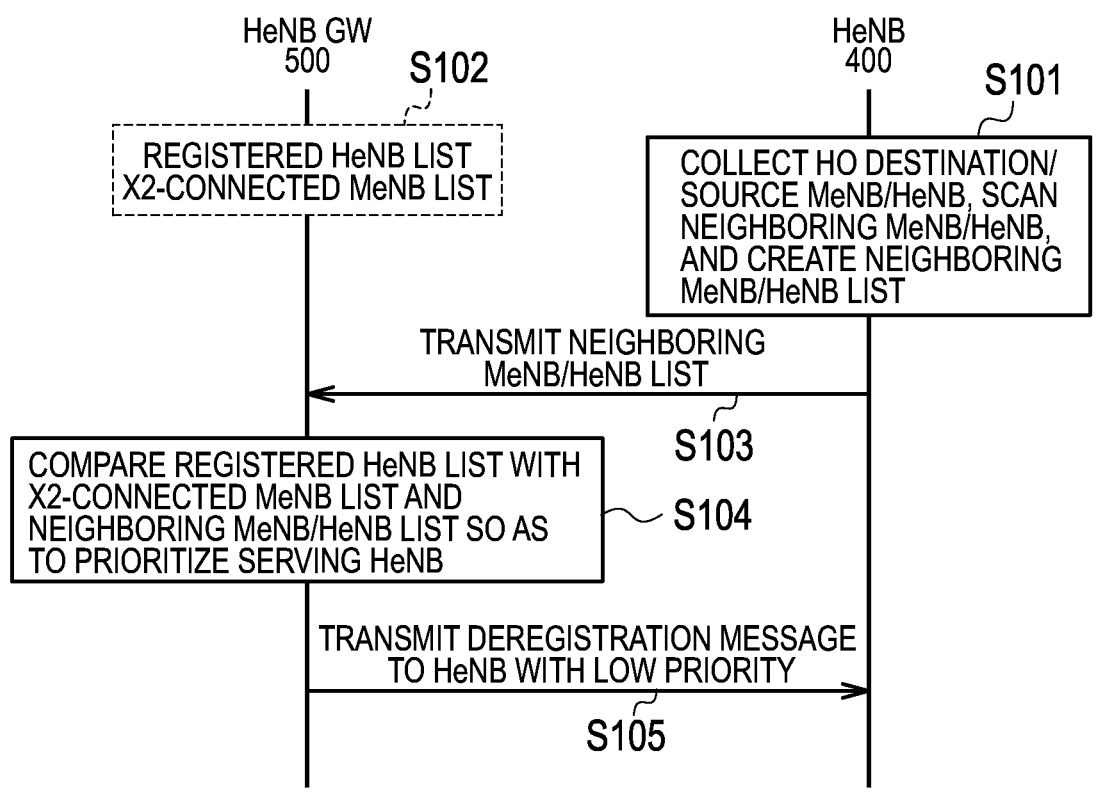
FIG. 10 shows an operation sequence of a mobile communication system.

FIG. 10 shows an operation sequence of the mobile communication system according to the present embodiment. For example, this sequence may be started as a trigger when the number of the HeNBs 400 registered in the control of the HeNB GW 500 exceeds a threshold value. Alternatively, this sequence may be started as a trigger when a load level of the HeNB GW 500 exceeds a predetermined level.

As illustrated in FIG. 10, in step S101, the HeNB 400 collects an implementation status of a handover to the HeNB 400 from another eNB and an implementation status of a handover to another eNB from the HeNB 400. The HeNB 400 creates a list of a handover destination eNB and a handover source eNB (hereinafter, referred to as "HO destination/source eNB lists"). Since a process of determining a handover destination of the UE 100 connected to the HeNB 400 is performed, the HeNB 400 can specify a handover destination eNB of the UE 100 in this process. In addition, since a process of determining whether or not the HeNB 400 implements a handover from another eNB to the HeNB 400 is performed, the MeNB 200 can specify a handover source eNB of the UE 100 in this process. In the present embodiment, the HO destination/source eNB lists includes both handover destination MeNB information and handover source MeNB information, but may include only either one of: the handover destination MeNB information; or the handover source MeNB information.

In addition, the HeNB 400 scans a radio signal from another eNB. The HeNB 400 creates a list of the eNBs present therearound (hereinafter, referred to as "neighboring eNB list") on the basis of the scanning result. For example, the HeNB 400 measures a received power of a reference signal received from another eNB, and when the received power is equal to or greater than a predetermined level, another eNB is included in the neighboring eNB list.

Meanwhile, in step S102, the HeNB GW 500 acquires a list of the HeNBs 400 connected to the HeNB GW 500 through the S1 connection (hereinafter, referred to as "registered HeNB list") and a list of the MeNBs 200 connected to the HeNB GW 500 through the X2 connection (hereinafter, referred to as "X2-connected MeNB list").

In step S103, the HeNB 400 transmits the HO destination/source eNB lists and the neighboring eNB list created in step S101 to the HeNB GW 500 over the S1 interface.

In step S104, the HeNB GW 500 prioritizes the HeNBs 400 in the control of the HeNB GW 500 on the basis of the HO destination/source eNB lists and the neighboring eNB list received from the HeNB 400 and the registered HeNB list and the X2 connection MeNB list acquired in step S102.

For example, the HeNB GW 500 raises a priority of the HeNB 400 having the X2 interface between the HeNB 400 and the MeNB 200 and/or lowers a priority of the HeNB 400 not having the X2 interface between the HeNB 400 and the MeNB 200. As described above, when the registration in the control of the HeNB GW 500 is canceled, the HeNB 400 having the X2 interface between the HeNB 400 and the MeNB 200 does not maintain the X2 interface. When the X2 interface is not maintained, signaling (traffic to the EPC 20) to the MME 300 increases. Accordingly, the HeNB 400 having the X2 interface between the HeNB 400 and the MeNB 200 is allowed to be in the control of the HeNB GW 500, so that it is possible to reduce the signaling of the MME 300 (the traffic to the EPC 20).

Otherwise, the HeNB GW 500 raises the priority of the HeNB 400 adjacent to another HeNB 400 in the control of the HeNB GW 500 and/or selects preferentially the HeNB 400 not adjacent to another HeNB 400 placed in the control of the HeNB GW 500, as the HeNB 400 to be deregistered. As described above, the HeNBs 400 in the control of the HeNB GW 500 can perform communication with one another through the HeNB GW 500 instead of the EPC 20 (the MME 300). For this reason, it is preferable to allow a pair of HeNBs 400 having a high frequency of communication between base stations, that is, a pair of HeNBs 400 adjacent to each other, to be in the control of the HeNB GW 500. Accordingly, the HeNB 400 adjacent to another HeNB 400 in the control of the HeNB GW 500 is allowed to be in the control of the HeNB GW 500, so that it is possible to reduce the signaling to the MME 300 (the traffic to the EPC 20).

In step S105, the HeNB GW 500 transmits the Deregistration message to the HeNB 400 having a low priority over the S1 interface on the basis of the result of the prioritization in step S104. The HeNB 400 receiving the Deregistration message disconnects the S1 connection with the HeNB GW 500, and establishes a new S1 interface not passing through the HeNB GW 500 between the HeNB 400 and the MME 300.

Figure 11:
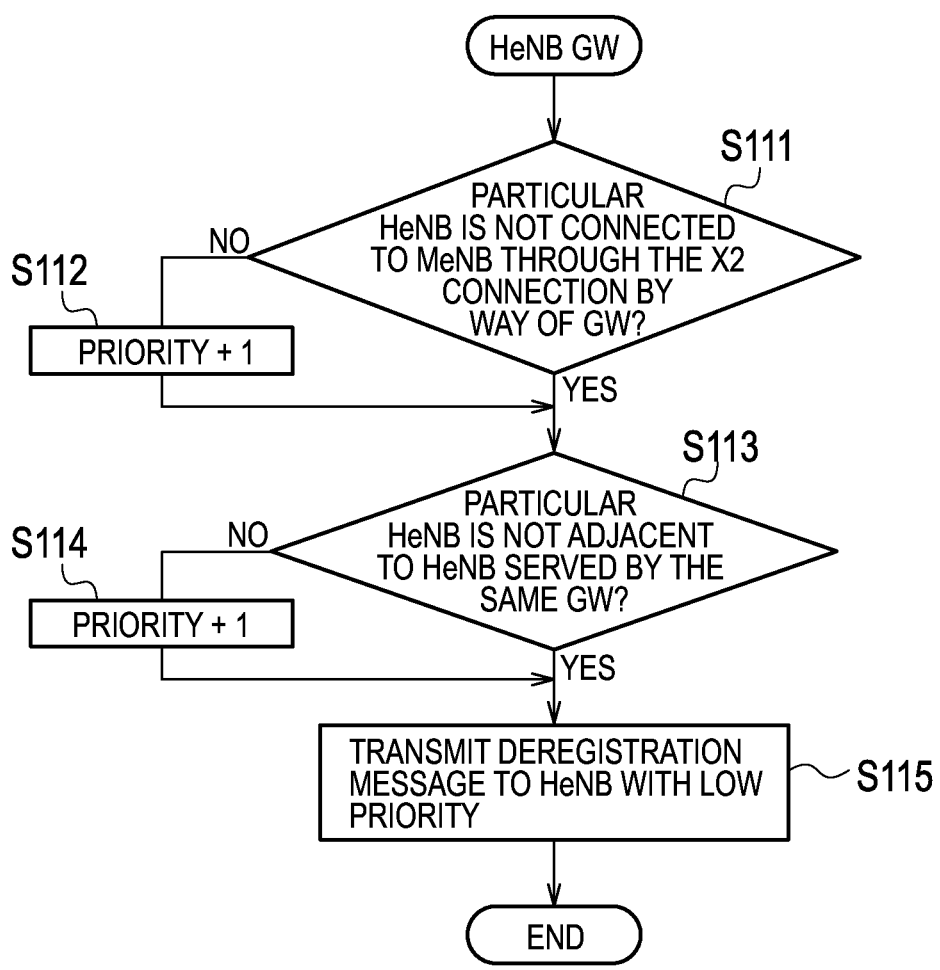
FIG. 11 is a flowchart showing a specific example of the prioritization in step S104 of FIG. 10.

FIG. 11 is a flowchart showing a specific example of the prioritization in step S104 of FIG. 10. Prior to this flow, the HeNB GW 500 is configured to specify the HeNB 400 having the X2 interface between the HeNB 400 and the MeNB 200 and the pair of HeNBs 400 adjacent to each other on the basis of the HO destination/source eNB lists and the neighboring eNB list received from the HeNB 400 and the registered HeNB list and the X2 connection MeNB list acquired in step S102.

In step S111, the HeNB GW 500 checks whether or not each HeNB 400 in the control of the HeNB GW 500 has the X2 interface between the MeNB 200 and the HeNB 400. A priority of the HeNB 400 having the X2 interface between the MeNB 200 and the HeNB 400 is raised by "+1" (step S112).

In step S113, the HeNB GW 500 checks whether or not each HeNB 400 in the control of the HeNB GW 500 is adjacent to another HeNB 400 in the control of the HeNB GW 500. A priority of the HeNB 400 adjacent to another HeNB 400 in the control of the HeNB GW 500 is raised by "+1" (step S114).

The values added in step S112 and step S114 are the same (that is, "1") but are not limited thereto, and the value added in step S112 and the value added in step S114 may be different to each other. For example, when the determination in step S111 is stressed depending on a reason for providing the HeNB GW 500, the value added in step S112 may be set to be greater than the value added in step S114. In addition, when the determination in step S113 is stressed depending on a reason for providing the HeNB GW 500, the value added in step S114 may be set to be greater than the value added in step S112.

In step S115, the HeNB GW 500 selects the HeNB 400 having a low priority among the HeNBs 400 in the control of the HeNB GW 500 and transmits the Deregistration message to the selected HeNB 400. For example, the HeNB GW 500 selects at least one HeNB 400 in an ascending order of priority so as to allow the number of HeNBs 400 registered in the control of the HeNB GW 500 to be less than a threshold value. Alternatively, the HeNB GW 500 selects at least one HeNB 400 in an ascending order of priority so as to allow a load level of the HeNB GW 500 to be less than a predetermined level.

(4) Summary of Embodiment

As described above, the HeNB GW 500 selects the HeNB 400 to be deregistered in the control of the HeNB GW 500 from among the plurality of HeNBs 400 and transmits the Deregistration message indicating the registration being canceled to the selected HeNB 400. Accordingly, under the environment where a number of HeNBs 400 are provided, since the number of the HeNBs 400 to be controlled is adjusted, the HeNB GW 500 can appropriately control the HeNB 400.

In the present embodiment, the HeNB GW 500 selects preferentially the HeNB 400 not having the X2 interface passing through the HeNB GW 500 between the HeNB 400 and another base station not in the control of the HeNB GW 500, as the HeNB 400 to be deregistered. In addition, in the present embodiment, the HeNB GW 500 selects preferentially the HeNB 400 not adjacent to another HeNB 400 in the control of the HeNB GW 500, as the HeNB 400 to be deregistered. Accordingly, under the environment where a number of HeNBs 400 are provided, the HeNB GW 500 can decrease the number of the HeNBs 400 to be controlled while exhibiting an effect of reducing the signaling to the MME 300 (the traffic to the EPC 20).

Other Embodiments

Thus, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

For example, in the aforementioned embodiment, the MeNB 200 has been described as the base station not in the control of the HeNB GW 500. However, the base station not in the control of the HeNB GW 500 may be a Pico base station (PeNB: Pico evolved Node-B). In such a case, the X2 interface passing through the HeNB GW 500 can be established between the HeNB 400 and the PeNB. Otherwise, the base station not in the control of the HeNB GW 500 may be the HeNB in the control of another HeNB GW. In such a case, the X2 interface passing through the HeNB GW 500 can be established between the HeNB 400 in the control of the HeNB GW 500 and the HeNB in the control of another HeNB GW.

In addition, the entire content of U.S. Provisional Application No. 61/611,996 (filed on Mar. 16, 2012) is incorporated in the present specification by reference.

INDUSTRIAL APPLICABILITY

As described above, the present invention is applicable in the field of the mobile communication field.

The invention claimed is:

1. A communication control method applied to a mobile communication system including a gateway device that is positioned between a core network and home base stations to control the home base stations, the method comprising:
    selecting, by the gateway device, a home base station to be deregistered in a control of the gateway device from among the home base stations; and
    transmitting, by the gateway device, deregistration information indicating a deregistration to the home base station selected in the selecting, wherein
    in the selecting, the gateway device preferentially selects, as the home base station to be deregistered, a first home base station or a second home base station,
    the first home base station is the home base station not having a communication channel passing through the gateway device between base stations with another base station not in the control of the gateway device, and
    the second home base station is the home base station not being adjacent to another home base station in the control of the gateway device.

2. A gateway device that is positioned between a core network and home base stations to control the home base stations, the gateway device comprising:

a selector configured to select a home base station to be deregistered in a control of the gateway device from among the home base stations; and a transmitter configured to transmit deregistration information indicating a deregistration to the home base station selected by the selector, wherein the selector is configured to preferentially select, as the home base station to be deregistered, a first home base station or a second home base station, the first home base station is the home base station not having a communication channel passing through the gateway device between base stations with another base station not in the control of the gateway device, and the second home base station is the home base station not being adjacent to another home base station in the control of the gateway device.

3. A gateway device that is positioned between a core network and home base stations to control the home base stations, the gateway device comprising:

a comparator configured to compare a predetermined parameter of the gateway device with a threshold value;

a selector configured to select a home base station to be deregistered in a control of the gateway device from among the home base stations when the predetermined parameter exceeds the threshold value; and a transmitter configured to transmit deregistration information indicating a deregistration to the home base station selected by the selector, wherein the predetermined parameter is a number of the home base stations registered in the control of the gateway device, or a load level of the gateway device.

* * * * *